United States Patent

[11] 3,616,373

[72] Inventor El-Ahmadi I. Heiba
 Mercer Couny, N.J.
[21] Appl. No. 735,177
[22] Filed June 7, 1968
[45] Patented Oct. 26, 1971
[73] Assignee Mobil Oil Corporation

[54] FREE RADICAL PRODUCTION OF 1,2 VINYL DISULPHIDES FROM ORGANIC DISULFIDES
 21 Claims, No Drawings

[52] U.S. Cl. ........................................................ 204/162 R,
 71/98, 204/158 R, 204/163 R, 252/45, 260/526.5,
 260/561 S, 260/465.1, 260/607, 260/544 Y,
 260/609 R, 260/609 A, 424/336
[51] Int. Cl. ........................................................ B01j 1/10,
 C07c 149/00
[50] Field of Search ........................................................ 204/162,
 158, 163; 260/609 R, 609 A, 609 B, 526 S, 561 S,
 465.1, 607, 544 Y

[56] References Cited
 UNITED STATES PATENTS

| | | | |
|---|---|---|---|
| 3,428,688 | 2/1969 | Heiba............................ | 260/609 A |
| 3,538,167 | 11/1970 | Griesbaum et al............. | 260/609 B |
| 2,051,807 | 8/1936 | Allen............................. | 204/162 |
| 2,352,435 | 6/1944 | Hoeffelman................... | 204/162 X |
| 2,411,983 | 12/1946 | Vaughan....................... | 204/162 |
| 3,432,542 | 3/1969 | Ransley........................ | 204/162 X |

OTHER REFERENCES
 Jacobs et al.; J. of Organic Chemistry, Vol. 28, Oct. 1963, pp. 2692– 2698 [ QD 241 J6]

*Primary Examiner*—Benjamin R. Padgett
*Attorneys*—Oswald G. Hayes, Donald L. Dickerson and Mitchell G. Condos

ABSTRACT: A process is described for preparing 1,2-vinyl disulfides by reacting an unsaturated compound selected from acetylenes and allenes with an organic disulfide in the presence of a free radical generator.

FREE RADICAL PRODUCTION OF 1,2 VINYL DISULPHIDES FROM ORGANIC DISULFIDES

BACKGROUND OF THE INVENTION

1. The field of the invention comprises the preparation of 1,2-vinyl disulfides by the free radical addition of organic disulfides to acetylenes or allenes.

2. While the free radical addition of thiols (mercaptans) to unsaturated compounds is known, this is not the case with the free radical addition of organic disulfides to acetylenes and allenes. According to the invention, a single step method is provided for making 1,2-vinyl disulfides, and the yields of product are high. The products are diverse and are characterized by various chemical structures, some of which are of known utility as insecticides, antiwear agents, petroleum additives, paint and oil additives, plasticizers, crabgrass control agents, etc.

SUMMARY OF THE INVENTION

The invention comprises reacting an acetylene or an allene with an organic disulfide in the presence of a free radical generator to form a 1,2-vinyl disulfide of the formula $$RC=CR'$$
$$R''S \quad SR'''$$

where R, R', R'', and R''' are selected from hydrogen, alkyl, substituted alkyl, aryl, substituted aryl, alkaryl, and aralkyl groups, and R'' and R''' may additionally be $$\overset{S}{\underset{\|}{(RO)_2P-}}$$

the last noted R being selected from the same groups as the first R.

DESCRIPTION OF THE SPECIFIC EMBODIMENTS

It is convenient to illustrate the invention by means of the following equations, wherein an acetylene, RC≡CR', is reacted with an organic disulfide, R''SSR''', using ultraviolet light as a free radical generator:

(1)

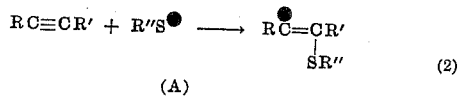

(2)

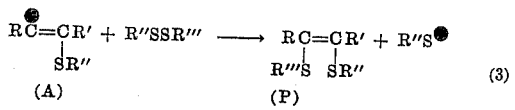

(3)

The R, R', R'', and R''' groups are as defined above in the summary. Equation (1) shows the homolysis or breakdown of the disulfide into two free thiyl radicals. Equation (2) shows initiation of a chain reaction by addition of one of the thiyl radicals to the acetylene compound, forming a free radical intermediate (A). Equation (3) shows propagation of the chain reaction by a transfer of a thiyl radical from the disulfide to the intermediate (A), forming the 1,2-vinyl disulfide product (P) plus a free thiyl radical. High yields of product (P) are obtainable, going up to 80 or 90 percent or more, based on consumed disulfide.

The acetylenic compound may include acetylene, propyne or methylacetylene, 1-butyne, 2-butyne, 1-pentyne, 2-pentyne, 3-methyl-1-butyne, vinylacetylene, 1,5-hexadien-3-yne, 1,5,7-octatriene-3-yne, butadiyne, 1,5-hexadiyne, 2,4-hexadiyne, n-butylacetylene, n-amylacetylene, n-dodecylacetylene, n-hexylacetylene, n-nonylacetylene, n-decylacetylene, cyclohexylacetylene, phenylacetylene, etc. In terms of the generic definition of the acetylene, RC≡CR', the group R may be hydrogen, or an alkyl group having one to 20 or 30 carbons, or substituted alkyl, or an aryl group like phenyl, naphthyl, etc., or substituted aryl, or an alkaryl or aralkyl group wherein the alkyl moiety has one to about 10 or 20 carbons. The R group may also be a halogen, acyl, aroyl, carboxy, amide, cyano, or thiyl group; or a group like —COCl, —COBr, —COF, —COOR₁ where R₁ is preferably alkyl. The R' group may be selected from the same values as the R group, and it may be identical to or different from said R group; preferably R' is hydrogen, alkyl, aryl, or other hydrocarbyl group, i.e., one containing only carbon and hydrogen. Acetylene compounds having a terminal triple bond are preferred. The compounds may be linear or branched, with the former preferred. Of the branched compounds, those having less branching are preferred, as are those with the branching more remote from the triple bond. The compounds may have up to 10, 20 or even 30 carbons; normally solid compounds may be dissolved in the disulfide or in an inert solvent such as a paraffin hydrocarbon.

As indicated, an allene compound is useful in place of the acetylene compound, and when used, equations (2) and (3) above may be written as equations (4) and (5), employing allene itself as the unsaturated compound:

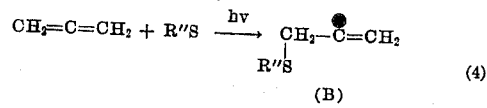

(4)

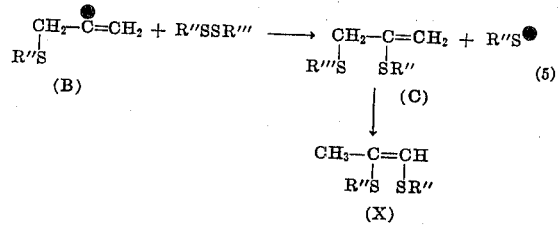

(5)

The free radical intermediate (B) of equation (4) undergoes further reaction, according to equation (5), forming the product (C) which rearranges to product (X). As is apparent, both products (P) and (X) are 1,2-vinyl disulfides. Other useful allenes include 1,2-butadiene, 1,2-pentadiene, 2,3-pentadiene, 3-methyl-1,2-butadiene, 2-methyl-2,3-pentadiene, 2,4-dimethyl-2,3-pentadiene, n-propylallene, as-methylethylallene, n-butylallene, as-diethylallene, etc. If the allene compound is generically defined as $$R-C=C=C-R'$$
$$\phantom{R-C=}R\phantom{=C=}R$$

the groups R and R' may be as described above in the case of the definition of the acetylene compound. The characteristics noted in respect of the acetylenes, i.e., terminal unsaturation, linearity, chain branching, carbon atoms, normally solid compounds, etc., apply also to the allenes. In addition, cyclic allenes are suitable.

The organic disulfide is one defined by the formula, R''SSR''', where R'' and R''' are as already described. Several classes of disulfides are within this definition, including alkyl and substituted alkyl disulfides like methyl disulfide, the formula of which is CH₃—S—S—CH₃, also ethyl disulfide, 1-chloroethyl disulfide, trifluoromethyl disulfide, 1-hydroxyethyl disulfide, n-propyl disulfide, isopropyl disulfide, n-butyl disulfide, isobutyl disulfide, 1-ethoxyethyl disulfide, n-pentyl disulfide, isopentyl disulfide, n-hexyl disulfide, n-heptyl disulfide, n-octyl disulfide, n-dodecyl disulfide, etc. Other classes comprise the aryl disulfides like phenyl disulfide, Ph—S—S—Ph, naphthyl disulfide, etc.; the alkaryl disulfides like tolyl disulfide, CH₃Ph—S—S—PhCH₃, ethylphenyl disulfide, propylphenyl disulfide, etc.; and the aralkyl disulfides like benzyl disulfide, PhCH₂—S—S—CH₂Ph, beta-phenethyl disulfide, o-chlortolyl disulfide, p-chlortolyl disulfide, p-chlor-beta-phenoxyethyl disulfide, beta-phenoxyethyl disulfide, benzyloxyethyl disulfide, p-methyl-beta-phenoxyethyl disulfide, msmethoxy-phen-bis-(oxyethyl) disulfide, p-isopropylbenzyl disulfide, etc. Also heterocyclic radical-containing disulfides like

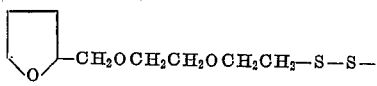

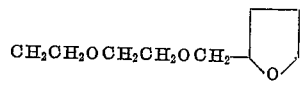

Another class comprises the carboxyalkyl disulfides like carboxymethyl disulfide, COOHCH$_2$—S—S—CH$_2$COOH, ethyl carboxymethyl disulfide, carboxyethyl disulfide, alpha-succinic acid disulfide, and similar compounds wherein the alkyl moiety may have up to 10 to 20 carbons and may be substituted by groups like halogen, carboxy, etc. Another useful class comprises the thiol carboxylic acid disulfides like thiol acetic acid disulfide, CH$_3$CO—S—S—COCH$_3$, chlorthiol acetic acid disulfide, dichlorthiol acetic acid disulfide, thiol propionic acid disulfide, thiol benzoic acid disulfide, etc. Also, O,O-dialkyldithiophosphoro disulfides like O,O-dimethyldithiophosphoro disulfide,

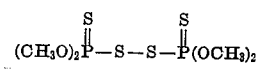

O,O-diethyldithiophosphoro disulfide, O,O-dipropyldithiophosphoro disulfide, etc. Also, O,O-dialkylthiophosphoro alkyl disulfides such as O,O-dimethylthiophosphoro methyl disulfide,

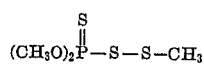

and other such compounds wherein the methoxy groups may be replaced by other alkoxy groups having up to 10 or 20 carbons, and wherein the methyl group may be substituted by other alkyl groups having up to 10 or 20 carbons. The methyl group may also be replaced by aryl or by any other hydrocarbyl group.

Broadly speaking, the invention may encompass any organic disulfide that forms an RS· free radical under the herein described conditions of the reaction. It further encompasses organic trisulfides, RSSSR′, and tetrasulfides, RSSSSR′, that form an RS· free radical under the reaction conditions herein described. These various sulfides may be designated organic polysulfides; all give a 1,2-vinyl disulfide product having the structure,

The free radical generator may be any conventional agent, including electromagnetic radiation and catalyst compounds containing —O—O— or —N=N— structural linkages.

A preferred radiation is ultraviolet light consisting essentially of one or more wavelengths in the range of 1,000 to 4,000 AU, preferably 1,800 or 2,000 to 3,850 AU. Any suitable source of radiation may be used, preferably a photochemical lamp like Hanovia, Type A, of 550 watts, or a Delmar Scientific Laboratories lamp, model DM-580, and the like. During application of the ultraviolet, it is preferred to maintain the mixture at or near room temperature, and if necessary cooling is used. The time of exposure is variable but generally may extend from a period of a few minutes to several hours. A suitable time period may be determined by a trial run or two in the case of any given reaction. An oxygen-containing atmosphere is preferably excluded as oxygen may intercept radical intermediates and decrease the yield; it is convenient to employ an atmosphere of nitrogen or other inert gas. Ultraviolet radiation is not only inexpensive but also selective and well absorbed.

Ionizing radiation is useful, particularly gamma radiation which is convenient to apply, especially in batch processes, and which does not produce a radioactivity effect in either the products or the equipment. Suitably the energy level is approximately 1 mev., although it may range from 0.5 to 15 mev., and more broadly from 1 kev. to 20 or 30 mev. It will be understood that the invention is not dependent on the energy level, which may be as low as is effective and as high as desired. The total radiation dose is variable, but should be at least sufficient to produce a chemical conversion and, of course, not so high as to destroy the product or the reactants. Illustrative total doses range from 0.0001 to 1000 megarads, and a preferred range is 0.01 to 10 megarads. A useful dose rate is about 0.1 megarad/hour, although this value may be increased or decreased as desired with corresponding changes in the time of irradiation. A typical range is 0.01 to 10, and a more general range is 0.001 to 100, megarads/hour.

Gamma radiation sources include radioactive materials like cobalt-60, praesodymium-144, cesium-137, sodium-24, manganese-56, gadolinium-72, cerium-144, lanthanum-140, etc., and also operating nuclear reactors. In addition, other ionizing radiation besides gamma is useful, including X-rays and fast neutrons, which like gamma radiation have good penetrating power. Less preferred are accelerated electrons, nuclear particles like protons, alpha and beta particles, deuterons, and fission fragments.

The free radical catalysts may include hydrogen peroxide; acyl or aroyl peroxides like benzoyl peroxide, acetyl peroxide, lauroyl peroxide, ter-butyl peroxide, diter-butyl peroxide, dibenzoyl peroxide, methyl benzoyl peroxide, acetyl benzoyl peroxide, methyl cyclohexyl peroxide, di-acetyl peroxide, ter-butyl hydroperoxide, ter-amyl hydroperoxide, diterhexyl peroxide, cumene hydroperoxide, tetralin hydroperoxide, phenylcyclohexane hydroperoxide, etc.; also alkali metal persulfates like sodium or potassium persulfates; perborates like alkali metal or ammonium perborates; percarbonates like ter-butyl percarbonate; and compounds like azobisbutyronitrile. The foregoing catalysts are used in small amounts ranging from 0.02 to 0.000005, preferably 0.001 to 0.0004, mol per mol of organic disulfide.

In some instances, the thermally induced decomposition of the disulfide may be sufficient to promote the reaction. For this purpose temperatures of about 200° to 400° C. are preferred, and it is desirable to employ liquid phase conditions, i.e., use of pressure, as in an autoclave. It may be noted that when free radicals are generated by means of radiation, operation is possible at any desired temperature, particularly room temperature. When free radical catalysts are used, the operation is not limited to the use of any particular type of equipment, as may be the case with radiation. In thermally induced reactions, where applicable, free radicals are generated independently of radiation or catalysts.

To carry out the process, the disulfide and the unsaturated compound are mixed in a weight ratio of 1:1, preferably up to 3:1, disulfide to unsaturated compound. If electromagnetic radiation is used as chain initiator, the temperature is preferably room temperature, the pressure is atmospheric, and the reaction time may extend over a period of up to 25, 50, or 100 hours or more. If desired, the radiation may be applied until a partial conversion of, say, 10 or 20 percent is obtained and the reaction is stopped. If a free radical catalyst is used, the temperature may extend from about −50° to 300° C., the pressure is preferably sufficient to maintain a liquid phase, and the reaction time may range from 1 or more hours to a day or more. As indicated, an oxygen-containing atmosphere is avoided. Whatever free radical generator is used, it may be desirable to employ a solvent to dissolve the reactants, such as an alkane, cycloalkane, aromatic, carboxylic acid or ester thereof, ether, etc. Where one reactant is soluble in the other, no solvent is required.

At the conclusion of the reaction, separation of the product may be effected as by conventional distillation, vacuum distillation, extraction, fractional crystallization, and the like, with or without the aid of conventional filtration or centrifugation.

As described, the product is a 1,2-vinyl disulfide corresponding to the formula

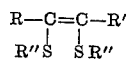

where R, R', R'', and R''' are selected from hydrogen, alkyl, substituted alkyl, aryl, substituted aryl, alkaryl, and aralkyl, and where R'' and R''' may also be

In a proper case, as illustrated by example 4, the product may comprise trans and cis isomers, with the former usually predominating. Product yields of up to 80 or 90 percent, based on disulfide consumed, are obtainable. These good yields are, of course, the result of a chain reaction wherein, for each radical of RS· that is generated, more than one molecule of product is obtained.

As may be seen, a wide variety of products are thus made available. Structures of the kind illustrated, particularly those containing phosphorus, are potential insecticides and petroleum additives. The —S—C=C—S— structure can undergo chelation with polar groups or with metals to give a stable five-membered ring,

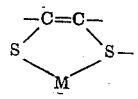

where M is a polar group or a metal, and compounds containing such ring are potentially useful as petroleum antiwear additives; or such ring-containing compound may be oligomerized or polymerized to form a molecule having several functional groups. Also, a product with the structure,

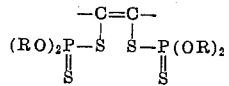

may be oligomerized or polymerized to a molecule having the structure

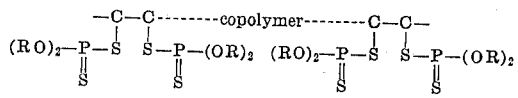

which is potentially useful as a nonmetallic detergent or an extreme pressure lubricant additive. Compounds having the structure,

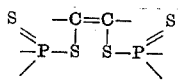

are potential antiwear additives for lubricating oil, and also are potential insecticides. In example, the product 1,2-bis-methylthio-propene-1, formed by the addition of methyl disulfide to methyl acetylene, was found to be a crabgrass killer. A product formed by the addition of carboxy-methyl disulfide (glycollic acid disulfide) to acetylene and containing the structure,

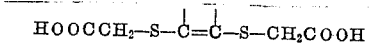

is of potential use for condensation with a diol to give a polyester, the latter being of value in plastic formulations and in the manufacture of fibers. And as may be apparent, products may be synthesized which contain relatively large amounts of sulfur and phosphorus in the molecule and which thus have potential application for making petroleum additives.

The invention may be illustrated by the following examples.

EXAMPLE 1

About 0.1 mole of 1-heptyne and 0.3 mole methyldisulfide were mixed in a glass tube, flushed with nitrogen, and then 0.005 mole of ter-butylperoxide was added. The tube was sealed and heated at 130° C. for 6 hours. Distillation yielded 1,2-bis-methylthio-heptene-1,

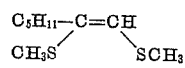

b.p. 91°–95° C./0.08 mm. yield about 80 percent of theory. Identity of the product was established by analysis, and infrared, ultraviolet, and nuclear magnetic resonance spectra.

EXAMPLE 2

The procedure of example 1 was repeated except that 1-heptyne was replaced by methylacetylene. The product was 1,2-bis-methylthio-propene-1,

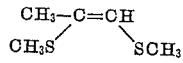

distilling at 193°–5° C.

EXAMPLE 3

The procedure of example 2 was repeated, but n-butyl disulfide was used instead of methyldisulfide. The product was 1,2-bis-n-butylthio-propene-1,

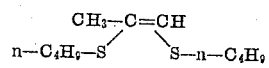

b.p. 130° C./5 mm.

EXAMPLE 4

Methyl disulfide in an amount of 0.5 mole was placed in a quartz tube, cooled in a dry ice bath, and 0.25 mole of allene placed in the tube where it liquefied. The tube was sealed under nitrogen and irradiated for 48 hours with ultraviolet light from a 200-watt Hanovia lamp. Then the tube was cooled at −78° C., opened, and unreacted allene vented, trapped, and analyzed. The reaction mixture was fractionated through a spinning band column, giving a colorless oil, b.p. 193°–5° C., yield about 90 percent. This material was analyzed further by vapor phase chromatography over a 10-foot column of 20 percent Carbowax on Chromosorb-P, and showed the presence of two isomers:

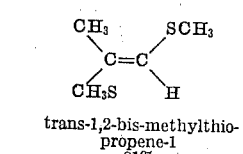 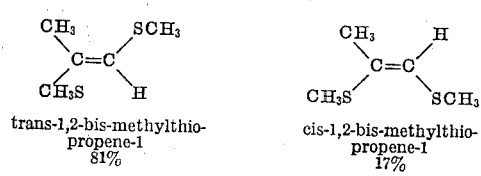

trans-1,2-bis-methylthio-propene-1
81% cis-1,2-bis-methylthio-propene-1
17%

The isomers were identified by analysis and by infrared, ultraviolet, and NMR spectra.

EXAMPLE 5

When example 4 was repeated, but using methylacetylene instead of allene, the same two isomers were obtained in a trans:cis ratio of 4:1.

EXAMPLE 6

Example 4 was repeated, except that n-butyl disulfide was used in place of methyl disulfide. Two major products were isolated:

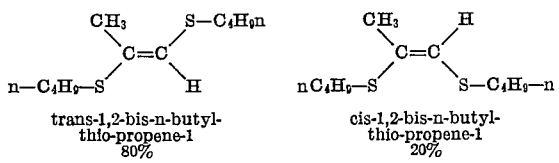

trans-1,2-bis-n-butyl-
thio-propene-1
80% cis-1,2-bis-n-butyl-
thio-propene-1
20%

EXAMPLE 7

Example 6 was repeated, except that the reactants were dissolved in n-heptane. The following products were obtained:

n—C₄H₉—S—CH₂—CH=CH₂  n-butylallyl sulfide yield 37.1%

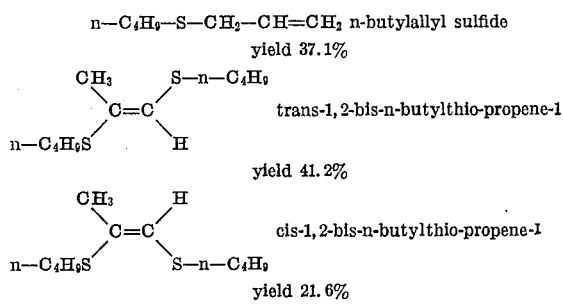

trans-1,2-bis-n-butylthio-propene-1 yield 41.2% cis-1,2-bis-n-butylthio-propene-1 yield 21.6%

Formation of n-butylallyl sulfide indicates that intermolecular hydrogen abstraction from the heptane occurs.

EXAMPLE 8

On repeating example 7, but using benzene as solvent instead of n-heptane, the products and product distributions are the same as in example 6. However, the reaction rate was slower.

It will be understood that the invention is capable of obvious variations without departing from its scope.

In light of the foregoing description, the following is claimed.

I claim:

1. Process for preparing a 1,2-vinyl disulfide which comprises forming a mixture of an unsaturated compound selected from an acetylene and an allene with an organic disulfide of the formula R″SSR‴ and generating in said mixture a thiyl radical from said disulfide with radiation or with a free radical catalyst to produce a 1,2-vinyl disulfide having the formula

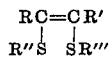

where R, R′, R″ and R‴ are selected from the group consisting of hydrogen, alkyl, substituted alkyl, aryl, substituted aryl, alkaryl and aralkyl, R and R′ are additionally selected from the group consisting of halogen, acyl, aroyl, carboxy, amide, cyano, thiyl, —COCl, —CoBr, —COF, and —COOR₁ where R₁ is alkyl, and R″ and R‴ may additionally be

the last-noted R being selected from the same group as the first R.

2. Process of claim 1 wherein said unsaturated compound is terminally unsaturated.

3. Process of claim 1 wherein said unsaturated compound is an acetylene.

4. Process of claim 1 wherein said unsaturated compound is an allene.

5. Process of claim 1 wherein said organic disulfide R″SSR‴ is an alkyl disulfide.

6. Process of claim 1 wherein said organic disulfide R″SSR‴ is an aryl disulfide.

7. Process of claim 1 wherein said organic disulfide R″SSR‴ is an aralkyl disulfide.

8. Process of claim 1 wherein said organic disulfide R″SSR‴ is an alkaryl disulfide.

9. Process of claim 1 wherein said organic disulfide R″SSR‴ is a thiol carboxylic acid disulfide.

10. Process of claim 1 wherein said organic disulfide R″SSR‴ is a carboxyalkyl disulfide.

11. Process of claim 1 wherein said organic disulfide R″SSR‴ is an O,O-dialkyldithiophosphoro disulfide.

12. Process of claim 1 wherein electromagnetic radiation is employed to generate said thiyl radical.

13. Process of claim 12 wherein said radiation comprises ultraviolet radiation of a wave length in the range of 1,000 to 4,000 Angstroms.

14. Process of claim 1 wherein a free radical-yielding catalyst selected from the group consisting of hydrogen peroxide, an acyl peroxide, an aroyl peroxide, a persulfate, a perborate, a percarbonate, and an azo compound is employed at a temperature of from about −50° to about 300° C. to generate said thiyl radical.

15. Process for preparing a 1,2-vinyl disulfide which comprises forming a mixture of an unsaturated compound selected from an acetylene and an allene with an organic disulfide of the formula R″SSR‴ and generating in said mixture a thiyl radical from said disulfide with radiation or with a free radical catalyst to produce a 1,2-vinyl disulfide having the formula

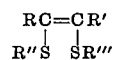

wherein R, R′, R″ and R‴ are selected from the group consisting of hydrogen, alkyl, substituted alkyl, aryl, substituted aryl, alkaryl and aralkyl.

16. Process for preparing a 1,2-vinyl disulfide which comprises forming a mixture of an unsaturated compound selected from an acetylene and an allene with an organic polysulfide of the formula R″SSR‴ and generating in said mixture a thiyl radical from said polysulfide with radiation or with a free radical catalyst to produce a 1,2-vinyl disulfide characterized by having the structure

17. Process of claim 16 wherein said polysulfide is a disulfide.

18. Process of claim 16 wherein said polysulfide is a trisulfide.

19. Process of claim 16 wherein said polysulfide is a tetrasulfide.

20. Process of claim 16 wherein electromagnetic radiation is employed to generate said thiyl radical.

21. Process of claim 16 wherein a free radical-yielding catalyst selected from the group consisting of hydrogen peroxide, an acyl peroxide, an aroyl peroxide, a persulfate, a perborate, a percarbonate, and an azo compound is employed at a temperature of from about −50° to about 300° C. to generate said thiyl radical.

* * * * *

UNITED STATES PATENT OFFICE
CERTIFICATE OF CORRECTION

Patent No. 3,616,373                Dated October 26, 1971

Inventor(s)    El-Ahmadi I. Heiba

It is certified that error appears in the above-identified patent and that said Letters Patent are hereby corrected as shown below:

Column 2, line 37 (formula)

Change

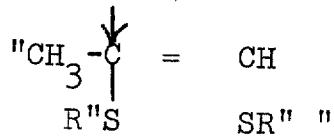

to

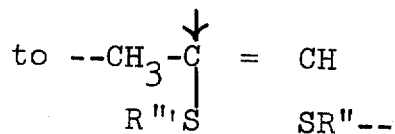

Column 3, line 2, after "fide", change "msmethoxy" to --m-methoxy--

Column 3, line 16, after "to" change "10 to 20" to --10 or 20--

Column 5, line 3 (formula)
Change "R"S   SR" "  to --R"'  SR"--

Column 7, line 55, after "COF" change "end" to --and--

Signed and sealed this 11th day of July 1972.

(SEAL)
Attest:

EDWARD M. FLETCHER, JR.
Attesting Officer

ROBERT GOTTSCHALK
Commissioner of Patents